Jan. 29, 1929.
J. M. WILEY
1,700,525
CULTIVATOR
Filed Nov. 19, 1926    2 Sheets-Sheet 1
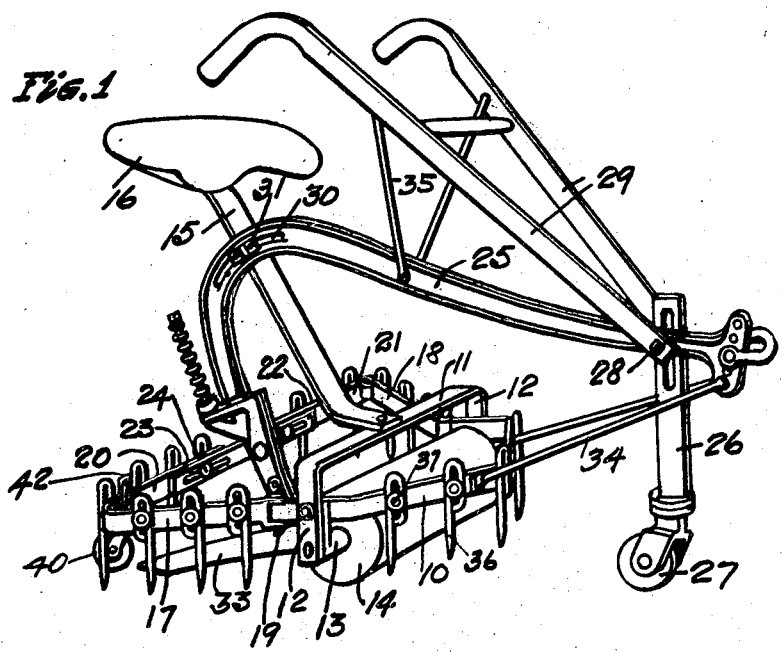
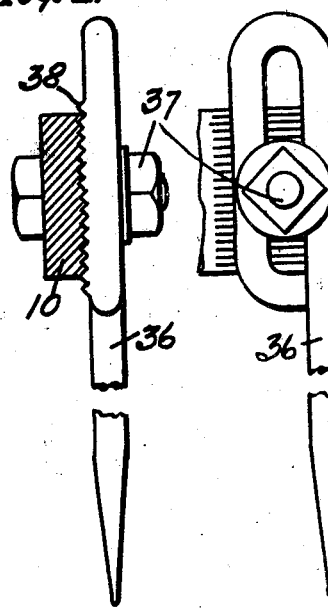
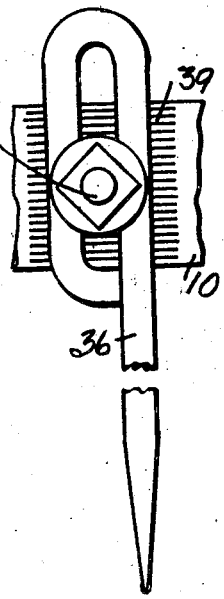
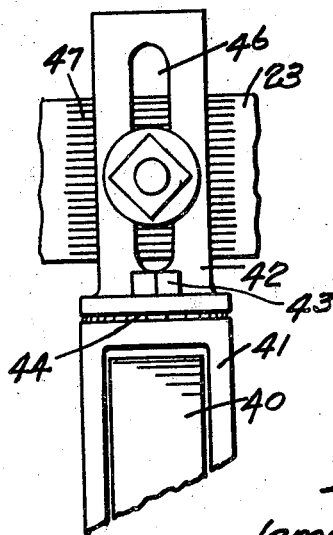
INVENTOR
James M. Wiley
by J H Weatherford
ATTORNEY

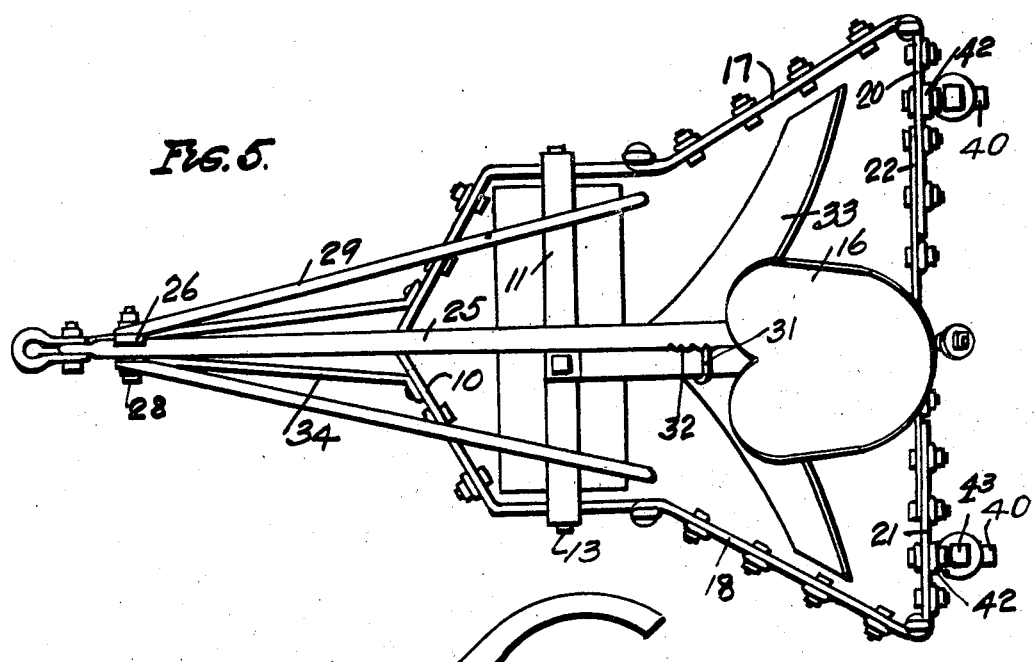
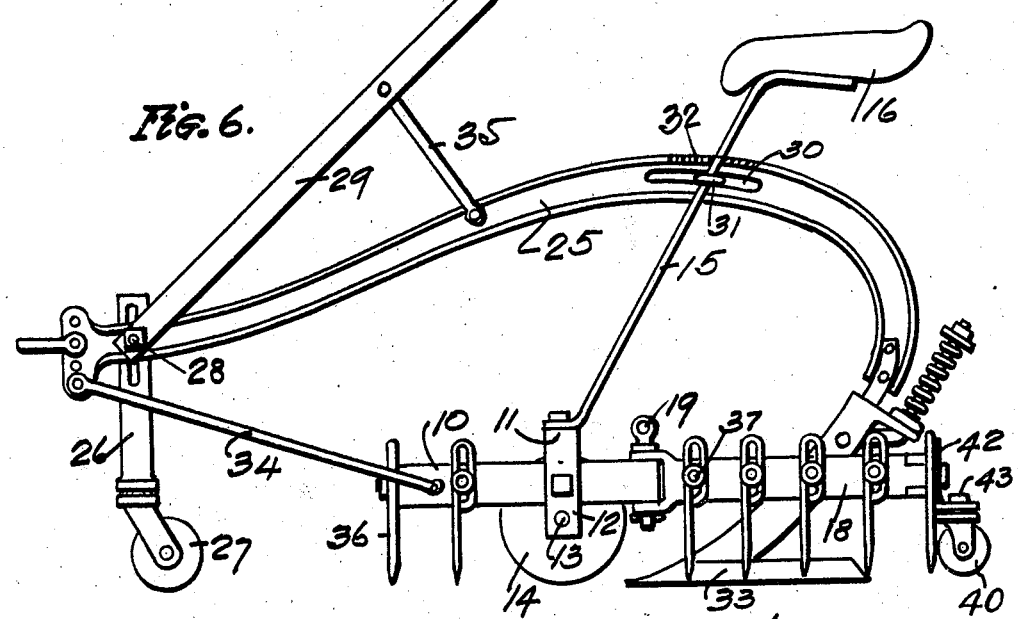

Patented Jan. 29, 1929.

1,700,525

UNITED STATES PATENT OFFICE.

JAMES M. WILEY, OF MEMPHIS, TENNESSEE.

CULTIVATOR.

Application filed November 19, 1926. Serial No. 149,380.

This invention relates to improvements in agricultural implements.

Among the objects of the invention are to provide a machine:

(a) In which the depth of cultivation, the width of the cultivated area and the level of same are within the direct control of the operator;

(b) In which, the soil turned by the plow is laterally confined;

(c) In which the soil is turned and pulverized in a single operation, preventing loss of moisture from the soil;

(d) In which the soil turned by the plow is immediately leveled or shaped;

(e) Which may be used independently as a plow or harrow; and (f) In which the above and other objects may be simply and economically accomplished.

The means by which these and other objects are accomplished, and the manner of their accomplishment will be more fully understood from the following description on reference to the accompanying drawings, in which,—

Fig. 1 is a perspective view of the cultivator.

Figs. 2 and 3 are enlarged detailed views of a harrow tooth, showing the means for adjusting the same.

Fig. 4 is a similar view of one of the rear rollers showing the means used for adjusting the same.

Fig. 5 is a plan view of the cultivator, and

Fig. 6 is a side elevation of the same.

Referring now to the drawings in which the various parts are indicated by numerals, 10 is a front frame or yoke, to which is securely fastened an inverted U-shaped cross member 11, the legs 12, of which, project below the frame 10 and provide bearings in which the axle 13 of a roller 14 are journalled. 15 is a seat bracket which is secured to the cross member 11 and which extends upwardly and rearwardly and carries a seat 16.

17, 18 are oppositely disposed side bars, the front ends of which are hinged to the rear of the yoke 10 on vertically disposed pins 19, so that the rear ends of the bars may swing laterally inward or outward. Similarly hinged to the rear ends of these bars, on similar pins, are rear bars 20, 21, each of which is adjustably secured to a third rear bar 22. The bar 22 may be provided with longitudinal slots 23, and if desired similar slots may be made in the bars 20, 21, and the bars be clamped by bolts 24, adjustment for width being made by loosening the bolts 24 and sliding the side bars in the direction desired and then reclamping.

25 is a plow beam, the front end of which is adjustably supported by means of a slotted standard 26, carrying at the lower end thereof a roller 27. A bolt 28, is used for clamping the standard 26 in adjusted position. This bolt also serves to secure the front and lower end of the handle bars 29. The beam 25 is provided with a slot 30, adjacent the seat bracket 15, and through this slot is passed a U bolt 31, which embraces the seat bracket 15, and clamps this bracket to the beam. The beam may be provided with corrugations 32, as shown in Fig. 5, and the edge of the seat bracket adjacent to the beam may be similarly corrugated so that the two, when clamped by the U bolt 31 will be securely locked together. By shifting the beam relatively to the seat bracket, the rear end of the beam may be raised and lowered in such manner as may be desired. 33 is a plow point, or sweep, which is carried by the rear end of the beam, and this sweep is raised or lowered as the beam is adjusted. 34 are braces connecting the front end of the beam with the front frame or yoke 10. 35 are handle bar braces. 36 are harrow teeth adjustably secured to the harrow frame, each by means of a clamping bolt 37. If desired the teeth may be provided with corrugations 38, as shown in Fig. 2, and co-acting corrugations 39 may be formed in the frame bars.

The rear end of the frame is carried by rollers 40, each of which is mounted in a yoke 41 (Fig. 4) which is swiveled to a bracket 42. 43 is a swivel bolt and 44 are balls providing for easy rotation. The bracket 42 is secured to the rear frames, 23 and 21, by a bolt 45, vertical adjustment being provided for by a slot 46. Corrugations 47, and co-acting corrugations on the bracket 42, similar to those on the harrow teeth, may be provided if it be so desired.

In use, the cultivator is adjusted so that the plow cuts to such depth as may be desired. When the cultivator is drawn by team or tractor, as the case may be, the plow throws the dirt outward in the usual manner where it is caught by the side and rear harrow teeth and is thrown back to a more or less level bed. At any time during the cultivation of the crop, should it be desirable the rear portion of the harrow may be detached by removing the pins 19 and if desirable the front teeth may also be removed, thus leaving the device as a double sweep plow.

From the foregoing description, it will be evident that the machine possesses advantages which cannot be had from a separate use of a plow and a harrow, since it is of the greatest importance that the side teeth at the front of the plow be in place at the time the plow is throwing the dirt outward, thus preventing the dirt from being thrown into a mass or ridge or from spreading too far. In other words, not only does the harrow, in the combination shown, function as a harrow but it also functions as a shield to prevent excessive spreading of the plowed dirt. In addition the cooperative action of the plow and harrow results in immediate pulverization of the soil, preventing escape of moisture therefrom such as occurs when the soil is opened up by a plow and thus left, and in addition provides a cultivation action such as cannot be solely accomplished by a harrow.

Should it be so desired, the harrow may be removed and the plow used alone or the plow may be removed and the harrow only be used.

It will of course be understood that the drawings herein are for purposes of illustration only, and that I do not wish to confine myself to the exact details shown, except in so far as such details may be specifically set out in the claims.

It will be further understood that, in order to more fully accomplish the first object set out, plows or sweeps of different width may be used. In other words, when a narrow area is to be cultivated, a narrow sweep will be used and when a broad area is to be cultivated, a wide one, with intermediate widths for intermediate areas.

Having thus disclosed the invention, what is claimed is:—

1. A cultivator, comprising plowing means and a surrounding harrow comprising a front frame, a roller journalled therein, side members hinged to said frame, a rear member hinged to the rear of said side members, means for adjusting the length of said rear member to vary the width of said harrow, means for adjustably supporting the rear of said frame, and harrow teeth secured to said frame.

2. In a cultivator, a frame comprising a front member, side members hinged thereto, and an adjustable rear section hinged to said side members, a plurality of teeth secured to said frame, a roller supporting the front member of said frame, rollers adjustably supporting the rear of said frame, a seat support extending upward from said frame, a seat carried thereby, a plow beam, an adjustable roller supporting the front end of said beam, means connecting said beam and harrow frame, means adjustably attaching said beam to said seat support, and a plow point carried by said beam.

3. In a cultivator, a frame comprising a front member, a roller supporting said member, a seat support extending upward from said frame, a seat carried thereby, a plow beam, an adjustable roller supporting the front end of said beam, means connecting said beam and frame, means adjustably attaching said beam to said seat support, and a plow point carried by said beam.

4. In a cultivator, a frame comprising a front member, side members removably hinged thereto, and an adjustable rear member hinged to said side members, a plurality of teeth adjustably secured to said frame, a roller supporting the front member of said frame, adjustable rollers supporting the rear of said frame, a seat support extending upward from said frame, a seat carried thereby, a plow beam, an adjustable roller supporting the front end of said beam, means connecting said beam and harrow frame, means adjustably attaching said beam to said seat support, and a plow point carried by said beam.

In testimony of the foregoing, I affix my signature.

JAMES M. WILEY.